United States Patent
Salmon

[11] Patent Number: 5,153,617
[45] Date of Patent: Oct. 6, 1992

[54] DIGITALLY CONTROLLED METHOD AND APPARATUS FOR DELIVERING TONERS TO SUBSTRATES

[76] Inventor: Peter C. Salmon, 70 Angela Dr., Los Altos, Calif. 94022

[21] Appl. No.: 658,397

[22] Filed: Feb. 20, 1991

[51] Int. Cl.$^5$ .................. G01D 15/06; G03G 15/06
[52] U.S. Cl. ................ 346/154; 346/157; 355/245; 355/326
[58] Field of Search ........... 346/154, 157, 159, 160.1; 355/326, 327, 245, 247–249; 118/645, 653, 654

[56] References Cited

U.S. PATENT DOCUMENTS

| | | | |
|---|---|---|---|
| 3,689,935 | 9/1972 | Pressman et al. | 346/159 |
| 3,778,678 | 12/1973 | Masuda | 361/233 |
| 3,872,361 | 3/1975 | Masuda | 361/233 |
| 4,491,855 | 1/1985 | Fujii et al. | 341/159 |
| 4,527,884 | 7/1985 | Nusser | 355/249 |
| 4,568,955 | 2/1986 | Hosoya et al. | 346/159 X |
| 4,653,426 | 3/1987 | Kohyama | 118/653 X |
| 4,733,256 | 3/1988 | Salmon | 346/157 |
| 4,743,926 | 5/1988 | Schmidlin et al. | 346/159 |
| 4,743,937 | 5/1988 | Martin | 118/653 X |
| 4,743,938 | 5/1988 | Ohno | 355/327 |
| 4,755,837 | 7/1988 | Schmidlin et al. | 346/160.1 |
| 4,780,733 | 10/1988 | Schmidlin | 346/160.1 |
| 4,810,604 | 3/1989 | Schmidlin | 346/157 X |
| 4,814,796 | 3/1989 | Schmidlin | 346/160.1 X |
| 4,860,036 | 8/1989 | Schmidlin | 346/159 |
| 4,868,600 | 9/1989 | Hays et al. | 118/653 X |
| 4,876,561 | 10/1989 | Schmidlin | 346/159 X |
| 4,876,575 | 10/1989 | Hays | 118/653 X |
| 4,912,489 | 3/1990 | Schmidlin | 346/159 |
| 5,030,976 | 7/1991 | Salmon | 346/157 |

Primary Examiner—A. T. Grimley
Assistant Examiner—William J. Royer
Attorney, Agent, or Firm—Flehr, Hohbach, Test, Albritton & Herbert

[57] ABSTRACT

An electrostatic printing apparatus employs digitally controlled imaging conveyors to print monocomponent toners on plain paper in a single pass. Pixel intensity is programmed by associating a counted number of packets of toner with each level of pixel depth. Additional embodiments include toner pumping conveyors, toner trapping conveyors, a self-regulating toner source module, and fixed and moving head color printers.

33 Claims, 10 Drawing Sheets

DIGITALLY CONTROLLED METHOD AND APPARATUS FOR DELIVERING TONERS TO SUBSTRATES

BRIEF DESCRIPTION OF THE INVENTION

This invention relates to electrostatic printing apparatus and method and more particularly to digitally controlled apparatus for delivering monocomponent toners in image configuration onto plain paper substrates.

BACKGROUND OF THE INVENTION

Of the various electrostatic printing methods, electrophotography has dominated high resolution monochrome printing for several decades. The electrophotographic process includes uniformly coating a photoconductive surface with charge, selectively exposing the charged surface with light to form a latent image, developing the latent image by causing charged toner particles to come in contact with it, transferring the image to a receiving sheet, and fixing the image. This printing method has produced high quality printing and has been refined to effectively service a broad range of printing applications. However it is mechanically complex, requires precision optical components, and has proven difficult to adapt to color printing.

Direct Electrostatic Printing (DEP) can be simpler than electrophotographic printing. In U.S. Pat. No. 3,689,935 Pressman et al disclose a DEP device in which toner is deposited directly through apertures onto a plain paper substrate in image configuration. This method has been improved by Schmidlin in U.S. Pat. No. 4,912,489 issued Mar. 27 1990 in which a control voltage as low as 100 V is sufficient to modulate the flow of toner through the apertures. The Schmidlin device employs a travelling wave conveyor to present toner to the printhead apertures. Generally, DEP processes have used single component insulating toners, and this has helped to simplify printing systems compared with prior two-component toner systems. The DEP devices do not require optics for the exposure step, nor do they require a photoconductive surface. Thus the printing process has been simplified. However, the apertures in the prior art DEP printers discussed above are subject to clogging arising from toner agglomeration. Additionally, ambient dust may clog an aperture. In either case, repair of a clogged aperture is likely to be difficult and costly. DEP line printers generally use multiple lines of apertures, for example four lines. The multiple lines of apertures are the result of manufacturing considerations relating to the apertures which are formed in a supporting member, with space provided for metal electrodes surrounding each electrode. This arrangement requires separating a pixel line of monochrome image data into data subsets, each subset corresponding to a line of apertures and their associated electrodes. Each data subset must be printed at a different time, with paper advances in between, in order that the original pixel line is reconstructed as a single line on the paper. Color printing generally requires the superposition of multiple monochrome images, and is more complex.

Travelling wave devices have been used to move particles along a tubular duct of insulating material. U.S. Pat. No. 3,778,678 issued to Masuda describes such a device which has three elongated electrodes spirally wound along its outer surface, uniformly spaced from one another. The electrodes are connected with the terminals of an alternating current source having a voltage of the order of 5-10 kV to produce a wave-like electric field within the duct by which particles are repelled from the inner duct surface and repulsively propelled along the duct. It is an object of the Masuda device to levitate the particles near the center of the tube, so that they do not make contact with the tube walls. A similar Masuda device is disclosed in U.S. Pat. No. 3,872,361 which discloses annular electrodes as well as elongated electrodes.

In U.S. Pat. No. 4,743,926 Schmidlin et al disclose a toner/developer delivery system that includes a pair of charged toner conveyors which are supported in face-to-face relation. A bias voltage is applied across the two conveyors to cause toner of one charge polarity to be attracted to one of the conveyors while toner of the opposite polarity is attracted to the other conveyor. Another embodiment includes a single charged toner conveyor supplied by a pair of three-phase AC current generators which are biased by a DC source which causes toner of one polarity to travel in one direction on the electrode array while toner of the opposite polarity travels generally in the opposite direction. In U.S. Pat. No. 4,876,561, also issued to Schmidlin, the charged toner conveyor may have over 400 electrodes per inch to enable a high toner delivery rate without risk of air breakdown.

U.S. Pat. No. 4,491,855 issued to Fujii at al, discloses an improved device for delivering charged particles to the vicinity of imaging electrodes. The improvement lies in that the charged particles are supported on a supporting member and an alternating electric field is applied between the supporting member and the control electrode. In U.S. Pat. No. 4,568,955 Hosoya et al disclose a recording apparatus using a toner-fog generated by electric fields applied to electrodes on the surface of a developer carrier. The electric fields are produced by an AC and a DC source connected to the electrodes, causing oscillations of the developer which generates the toner fog. U.S. Pat. No. 4,653,426 issued to Kohyama discloses the improvement of an AC voltage whose frequency varies with time. The voltage is applied to the gap between a toner carrying surface and a drum whose surface contains an electrostatic latent image. The multiple frequencies increase the toner particle jumping probabilities, thus improving gradation and denseness properties of the resulting developed image.

U.S. Pat. No. 4,876,575 issued to Hays discloses an apparatus for dynamic toner metering and charging of nonmagnetic single component toner. The apparatus includes a flexible rotating rod having an electric bias applied thereto, and the rod is in a self-spaced relationship to a rigid donor roll. The apparatus effectively creates a monolayer of charged toner on the donor roll.

U.S. Pat. No. 4,743,938 issued to Ohno, discloses a rotary assembly for carrying a plurality of developing units in a color image forming apparatus. A driving mechanism is provided that is engageable with any one of the developing units which revolve on the rotary assembly.

OBJECTS AND SUMMARY OF THE INVENTION

It is an object of the present invention to provide a printing apparatus and method for printing a monochrome image on plain paper substrates at high speed, using simple parts and processes.

It is a further object to provide an electrostatic printing apparatus and method which can modulate the depth of toner in each pixel position with high accuracy and at high speed.

It is a further object to provide an electrostatic printing apparatus and method for printing color images at high speed and high resolution, and with a large number of possible colors in each pixel position, using simple parts and processes.

It is a further object of the invention to provide an electrostatic apparatus and method for printing a full color image with a single pass of the receiving sheet past the printhead, thus simplifying the printing process compared with printing methods that require four-color separations to achieve a full range of colors.

It is a further object to provide a digitally controlled imaging apparatus which offers both high speed and precision at low cost, for example by performing digital imaging algorithms with large scale integrated circuits.

It is another object of the invention to provide a print engine which is compact in size, light in weight, and quiet in operation.

It is another object to provide a toner source module that can produce uniformly charged particles on a supporting member at a high supply rate to support high speed printing.

It is another object to provide a toner source module which can be located remotely from the printing engine to provide flexibility of physical design, maintenance and service.

A further object of the invention is to provide a toner supply that eliminates contamination of the print engine and avoids human exposure during toner replenishment, and which can be refilled while printing. It is a further object to avoid contamination of the human environment during printing operations by using dry toners which do not produce toxic vapors such as might be produced by evaporation of solvent from a liquid toner.

It is still another object of the invention to provide a printing machine that can adjust to multiple users with different needs. For example multiple users of a print server on a computer network may require a diversity of black and white printing and color printing, and it is useful to service all the users with a single printer. In addition, each user may have varying print requirements within a document.

The foregoing and other objects of the invention are achieved by a digital pumping apparatus for moving charged particles along arrays of electrodes on a substrate. In an electrostatic printer embodiment a digital imaging conveyor moves packets of charged toner between a toner source and the receiving sheet disposed adjacent to the electrodes at one end of the conveyor. The substrate of the imaging conveyor is a flex circuit whose width is the instantaneous print width, plus a margin. Charged toner particles are presented to the imaging conveyor in the form of a toner cloud. The imaging conveyor has a loading end where packets of toner are attracted from the toner cloud onto electrodes on the surface of the imaging conveyor. The electrodes are provided in linear arrays, with one linear array for each pixel site to be printed. Packets of toner jump from electrode to electrode within a linear array in response to programmed voltage pulses applied to the electrodes. A multiphase digital clock generator produces a different set of voltage pulses $\Phi 1$ $\Phi 2$, and $\Phi 3$ for each linear array, and each linear array can support an independently controlled toner stream comprised of toner packets adhering to electrodes of the linear array. $\Phi 1$, $\Phi 2$, and $\Phi 3$ are connected in phase order to the electrodes of each linear array, via drive lines provided for each linear array. By providing a digitally pumped linear array for each pixel site to be printed, a full line of pixels across the width of a page can be printed simultaneously. The amount of toner delivered to each pixel is metered by associating a counted number of toner packets with each level of pixel depth, and applying the appropriate number of pulses corresponding to the depth of toner required for that pixel, before stepping the paper and imaging the next line. Packets of toner are transferred from the imaging conveyor to the receiving sheet at a transfer end of the imaging conveyor. A toner packet is released from an electrode at the transfer end by switching the polarity of the voltage applied to the electrode, thereby switching from attraction to repulsion of the toner packet. The released toner packet is then captured by the electric field associated with a uniform charge applied to the back side of the receiving sheet by a corona discharge device; thus the toner packet is captured in pixel position on the front side of the receiving sheet. The complete imaging conveyor, from loading end to transfer end, is a preferred embodiment of the digital pumping engine of the present invention.

In another embodiment, a digitally pumped toner source module provides well charged toner at a controllable rate.

A further embodiment utilizes the digital pumping engine to filter contaminant particles from a toner stream, and move them to a storage container.

A further embodiment combines multiple digitally pumped imaging conveyors for color printing. The color printing engine disclosed is capable of high speed and high resolution printing with fine color control, and can be simpler and more efficient than prior art color printers.

A further embodiment employs a moving head for low cost monochrome or color printing.

The present invention is a printing apparatus for printing on an image receiving member comprising: a source of toner particles; at least one particle conveyor means that conveys toner particles from a loading point adjacent the toner source to a transfer point adjacent the image receiving member; means for presenting the image receiving member to the particle conveyor at the point of transfer; means for transferring particles from the transfer point to corresponding pixel sites on the image receiving member; and means for applying and controlling voltages to the conveyor means to deliver a predetermined amount of toner to each of said corresponding pixel sites on the image receiving member.

BRIEF DESCRIPTION OF THE DRAWINGS

The invention will be understood from the descriptions to follow when read in connection with the accompanying drawings of which:

FIG. 14 is a side-elevational view of a digitally pumped toner source assembly including tubular input and output ports, and a sheet conveyor section in between.

DETAILED DESCRIPTION OF THE PREFERRED EMBODIMENTS

Figure 1:
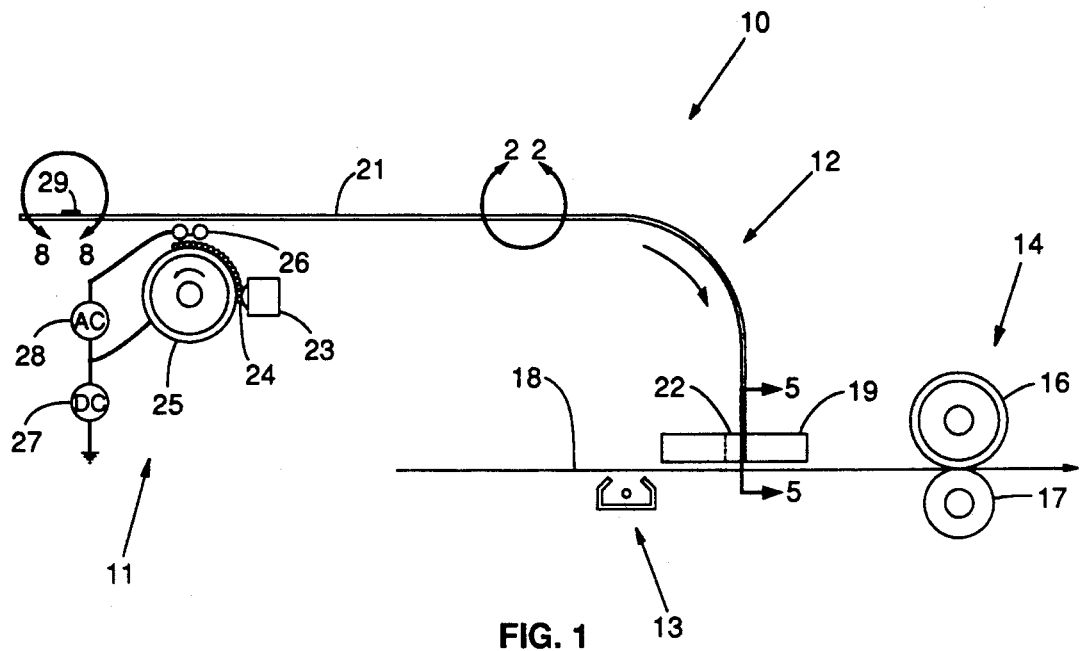
FIG. 1 is a schematic, side elevational illustration of an apparatus representing the present invention in an electrostatic printer, using a toner source known in the art.

FIG. 1 is an embodiment of a digitally pumped printing apparatus 10 incorporating the invention. Printing apparatus 10 includes a source of charged toner particles 11, a digitally pumped imaging conveyor 12, a corona discharge device such as a corotron 13, and a fixing assembly 14. In the preferred embodiment the toner is a monocomponent non-magnetic insulating toner comprised of a resin binder, colorants, and additives, as is known in the art. Fixing assembly 14 includes a heated fusing roller 16, and a backup roller 17 as is known in the art. In the preferred embodiment, backup roller 17 also serves as a drive roller for advancing print substrate 18. Also included is a printhead 19 for supporting flex circuit 21 which is the substrate for imaging conveyor 12. The printhead 19 includes a slot 22 with sufficient lateral dimension for toner packets (not shown) to pass through unimpeded. The longitudinal dimension of slot 22 is the same as the print width which is a full page width in the preferred embodiment. As will be described, this provides high speed printing with a full line of pixels imaged simultaneously.

As will be described, imaging conveyor 12 delivers packets of toner to a transfer end of flex circuit 21 in close proximity to print substrate 18. Transfer of toner packets from the transfer end of flex circuit 21 to print substrate 18 is assisted by uniformly charging the back side of the print substrate using the corona discharge device 13, as is known in the art. Toner packets are released from the end of the imaging conveyor during transfer as will be described further in relation to FIG. 5. Print substrate 18 is advanced by one pixel position using a stepper motor (not shown) driving roller 17 after the correct amount of toner has been applied to each pixel site in the current print line.

The source of charged toner particles will now be described. It is known in the art how to supply a monolayer of charged monocomponent insulating toner on a supporting surface, see for example U.S. Pat. No. 4,876,575 issued to Hays. A combination metering and charging device 23 applies a monolayer of charged toner on the surface of donor roll 25. In the preferred embodiment of the present invention, the toner charge is negative. The toner monolayer 24 rotates into position under an electrode structure 26 which is biased by DC voltage source 27 and AC voltage source 28. The effect of this arrangement is to create a cloud of negatively charged toner particles in the space between electrode structure 26 and the toner receiving electrodes (not shown) on imaging conveyor 12, as is known in the art.

Figure 2:
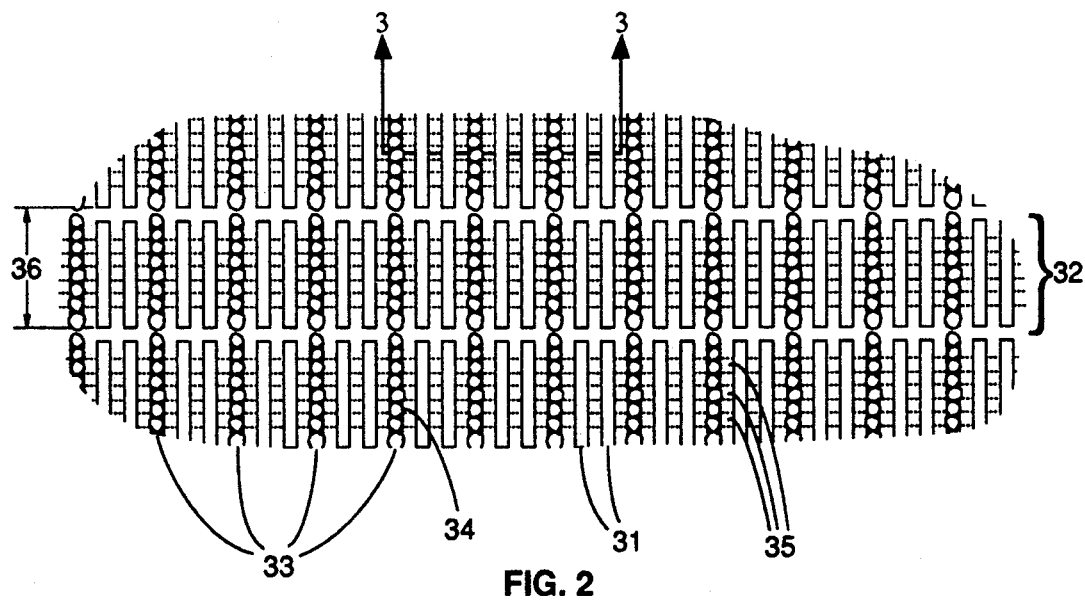
FIG. 2 is an enlarged partial plan view of the portion 2—2 of FIG. 1 showing lines of electrodes forming linear arrays and associated packets of toner corresponding to a plurality of toner pumps, one for each toner stream.

FIG. 2 is an expanded plan view of the portion 2—2 of FIG. 1, and shows details of the electrodes on the surface of imaging conveyor 12. Electrodes 31 are provided in linear arrays, for example array 32, with one linear array for each pixel site to be printed on the print substrate 18. When an electrode 31 at the loading end of conveyor 12 in the vicinity of a cloud of negatively charged toner particles is pulsed positively, toner will adhere to that electrode, forming a toner packet 33 comprised of a row of individual toner particles 34. As will be described, when consecutive electrodes in an array are pulsed in phase order, the toner packet will follow the positively pulsed electrodes, jumping from electrode to electrode across the gap between them, and travel to the transfer end of the imaging conveyor for delivery to the print substrate. Thus each linear array of electrodes forms an independently controlled conveyor. The electrodes 31 of each array 32 are connected in phase order via three feed lines 35 on the back side of flex circuit 21 to three phases of a digital clock which will be explained in more detail later in reference to FIG. 3. Briefly, the phases are digitally programmed to advance toner packets along each array over the surface of flex circuit 21 until they reach the transfer end of the individual arrays or conveyors of the imaging conveyor at the printhead 19. Details of the transfer process will be given in discussion of FIG. 5. The repeat width 36 between linear arrays 32 determines the print resolution. In the preferred embodiment, repeat width 36 is 83.3 microns (0.0033 inches) corresponding to a print resolution of 12 pixels per millimeter (305 pixels per inch). It is desirable to maintain approximately a constant number of toner particles 34 per packet 33, in order that the digital metering of toner according to a counted number of packets will deliver a precise amount of toner. As will be discussed in reference to FIG. 4, the operating voltages of the toner source module and the imaging conveyor are adjusted such that packets are formed with only a single layer of toner particles formed in a row as shown.

Figure 3:
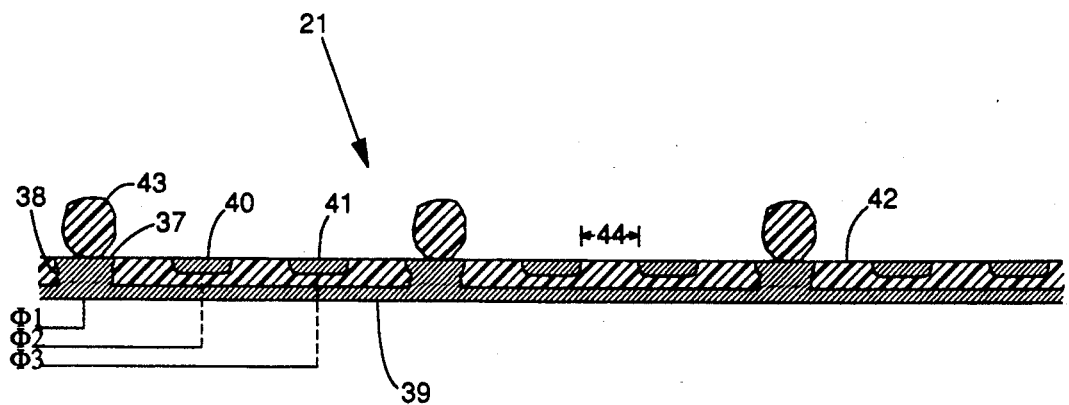
FIG. 3 is a further enlarged cross-sectional view of section 3—3 of FIG. 2 showing metallic electrodes embedded in an insulating sheet, and toner particles adhering to electrodes connected to Φ1 of the multiphase clock.

FIG. 3 shows an expanded cross-sectional view of the section 3—3 of FIG. 2. Electrodes 37 are connected via feedthroughs 38 to feed line 39 which extends longitudinally along the substrate. Electrodes 40 and 41 are connected to $\Phi2$ and $\Phi3$ of the digital clock but the corresponding feed lines and feedthrough connections do not show in the chosen cross-section. Flex circuit 21 is built from a substrate of insulating material 42. Toner particles like 43 jump from electrode to electrode across a gap 44 as positive pulses are applied in order to $\Phi1$, $\Phi2$, and $\Phi3$. In the preferred embodiment, the gap 44 is approximately 10 microns (0.0004 inches). The electrodes, feedthroughs, and lines are formed in the insulating material 42 using a hot stamping method utilizing precision engraving plates.

Figure 4:
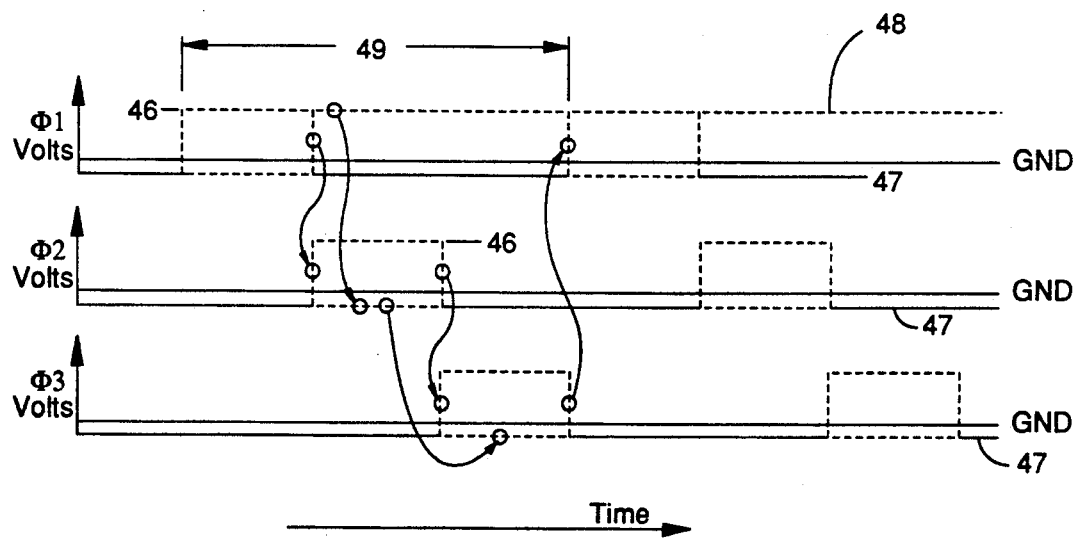
FIG. 4 presents graphs of voltage versus time for three phases of a multiphase digital clock of the present invention, showing programmable square-wave pulses.

FIG. 4 shows voltage waveforms as a function of time for the three phases of the digital clock, $\Phi1$, $\Phi2$, and $\Phi3$. The dotted lines indicate that the transitions to a positive amplitude value 46 are programmable. For example, if it is not desired to step the toner packets, then $\Phi1$ will stay at positive voltage level 46 and $\Phi2$ and $\Phi3$ will stay at negative voltage level 47. However when $\Phi1$ transitions to the negative polarity, it will be followed in order by short positive pulses in the $\Phi2$ and $\Phi3$ positions. Positive pulse amplitude 46 represents the value required to jump toner across the gap 44, FIG. 3, when the neighboring electrodes are at negative voltage 47. Negative voltage 47 is the voltage required to prevent adherence of toner to an electrode, and is used to release toner packets from electrodes during transfer from the imaging conveyor to the receiving sheet, as well as for freeing packets to jump to a neighboring electrode to which a positive pulse is applied. At least three phases per cycle are required so that toner packets will continue stepping forward on the toner stream path by finding a shorter distance to a positively pulsed neighbor in the forward direction than in the reverse direction. In general however, the digital pumping method can be used to pump a stream of toner packets in either a forward or reverse direction, or to hold the packets in a stable condition at the current position. Dotted line 48 indicates that a pulse may stay at positive voltage 46 in order to hold a packet at the current electrode position, and this feature will be utilized in the transfer process, as described further in relation to FIG. 5. In all modes of operation herein described, the clock phases are programmed such that only one phase is at positive voltage 46 and the other two phases are at negative voltage 47. Thus toner packets will adhere to only one out of three electrodes in the linear array of electrodes.

The preferred shape of the programmed pulses is square, as shown in FIG. 4. U.S. Pat. No. 4,653,426 issued to Kohyama, teaches that a group of sinusoidal frequencies more effectively jumps toner across a gap than a single frequency. For a given peak voltage, a square wave pulse will be even more effective in jumping toner across gap 44 of FIG. 3 because a square wave contains a large and continuous range of frequency components. Kohyama applied several frequencies in a time sequence. Square waves effectively apply a greater number of frequencies simultaneously, owing to the large number of harmonics inherently present within a square wave. However, the present invention is not limited to particular types of phased waveforms.

The positive voltage 46 on the electrodes of the linear array can be adjusted relative to DC voltage 27 and AC voltage 28 of the source of charged toner particles 11 of FIG. 1, such that toner packets are formed with a single line of toner particles, with approximately a constant number of toner particles in each packet. After a line of toner particles covers an electrode, the charge on the toner particles tends to inhibit further accumulation of toner on that electrode. Generally, a higher voltage 46 will attract more toner, and a lower voltage 46 will attract less toner. Thus, in the preferred embodiment, the value is set high enough to jump toner from electrode to electrode, and low enough to provide approximately one sixty-fourth of the amount of toner required to saturate a pixel corresponding to 64 levels of toner depth in each pixel location in the preferred embodiment of the present invention.

Many suitable algorithms are possible for synthesizing an image using digitally generated multi-phase clocks such as $\Phi1$, $\Phi2$, and $\Phi3$. Referring to FIG. 1 an integrated circuit 29 is mounted on the flex circuit 21 and is used to convert image descriptions from an information source into programmed pulses for operating the imaging conveyor 12, as will be described further in FIGS. 8 and 9. The information source provides 6 bits of intensity data per pixel corresponding to 64 levels of toner depth in the preferred embodiment.

The integrated circuits 29 receive the six bit data word from the information source and control the application of phased pulses to the electrodes of the linear arrays. The print substrate is stopped opposite the printhead for a period of time which allows the transfer of up to 63 packets of toner at each pixel site. The stepping pulses are turned on to step the required number of packets for the toner depth desired. Thus an array 32 only receives a set of stepping pulses if toner is required, and none if no toner is required. On the other hand sixtythree clock cycles are delivered during the period if full toner depth is required. The print substrate (paper) is then stepped into position to receive the next line of pixels.

Several operating sequences are now described to further elaborate the print algorithm of the preferred embodiment. A "packet load" is defined as loading a single packet of toner from the toner cloud source to an electrode at the loading end of the imaging conveyor 12 by applying a positive voltage to the receiving electrode. A "packet step" is defined as moving a toner packet over three electrodes in an array, in response to the clock associated with the array. A "packet hold" is defined as holding a packet for a single toner array in position several electrodes short of the transfer position, such that it is only weakly affected by the electric fields associated with the uniform charge applied to the back surface of the receiving sheet, and is not transferred to the receiving sheet. The active clock phase for the held toner arrays is maintained continuously at its positive polarity, indicated by 48 in FIG. 4, while the other toner streams advance by performing packet steps. A "packet transfer" is defined as performing packet steps to move a toner packet from the hold position to the transfer position which is at the end electrode of the toner array, subsequently switching the voltage applied to the end electrode of the array to the negative polarity, thereby releasing the packet for transfer to the surface of the receiving substrate. A "print cycle" is defined as the combination of a packet hold for all pixels requiring zero toner, and a packet transfer for all pixels that require toner. An "image cycle" is defined as application of the full number of print cycles to satisfy the maximum programmed pixel depth of the current line, followed by a paper advance. When printing first begins after powering on the equipment, a number of packet loads occur for each independent toner array, until the leading packets are in the hold position. Next, any toner arrays that have zero packets to print will perform a packet hold. The other toner arrays that are not holding will advance and perform a packet transfer to the substrate. Whenever a toner array participates in a packet transfer, a packet load will automatically be performed at the loading end of the toner conveyor. This process is repeated for 63 print cycles to deposit toner with 64 possible levels of toner depth in each pixel position; the 64th level corresponding to zero toner delivered. The receiving sheet is then stepped to the next pixel position, and the next 63 print cycles are performed. When multiple image cycles have occurred and the image is complete, multiple advances of the receiving sheet will cause it to pass through the fuser, whereupon the completed page is ejected from the print engine using known methods. At the end of a printing session, a cleaning cycle may be performed with no receiving sheet at the transfer station. First the toner cloud source is de-activated so that subsequent packet transfers do not cause simultaneous packet loads. Then a sufficient number of packet transfers are performed to transfer all the toner remaining on the imaging conveyor. This transferred toner is captured in a cleaning reservoir (not shown) where it is held until discarded during routine maintenance.

By building flex circuit 21 with smaller electrode repeat width 36 of FIG. 2, higher resolution printing can be achieved. Also by building the flex circuit with smaller gap distances 44 of FIG. 3, the positive voltage 46 can be reduced since the fringing field required to jump toner particles from electrode to electrode varies inversely with the gap 44 between electrodes. Using small gap distances of the order of 10 microns (0.0004 inch), square shaped pulses comprised of multiple harmonic frequencies, and multiple toner packets per pixel, it is anticipated that positive voltage 46 can be as low as 5-20 volts which can be implemented with standard low cost CMOS silicon wafer processing. Since, in the preferred embodiment, there are 64 levels of toner depth, it is desirable to have a small amount of toner in each packet, approximately one sixtyfourth of the amount of toner required to saturate the pixel. Thus a large number of toner packets per pixel is desirable for fine control of toner depth, and this corresponds to a low value of positive voltage 46.

A conventional CMOS output driver circuit can switch 20 volt levels in a few tens of nanoseconds using standard silicon wafer processes, when capacitively loaded as in the preferred embodiment. For example a cycle time of 1 microsecond for generating one complete cycle 49 of the three phase digital clock in FIG. 4 is achievable. For 64 toner depth levels, a pixel line can be imaged and transferred to the print substrate every 65 microseconds in the preferred embodiment, including 63 microseconds for shifting the packets plus 2 additional microseconds for the transfer process to be described in FIG. 5. At a print resolution of 12 dots/mm (305 dots/in) this corresponds to an imaging rate of 6 pages per second for a 204 mm (8 inch) print length in the preferred embodiment which passes an 8 and ½ by 11 inch sheet through the print engine with the printhead parallel to the 11 inch edge. Since the rates of toner supply, transfer, paper stepping, and fusing are all independently adjustable, practical printer can be built using the preferred embodiment at printing rates approaching six pages per second. These printing rates may be achievable while providing toner depths of 64 for monochrome printing, and 16.7 million for color printing in the preferred embodiments.

Figure 5:
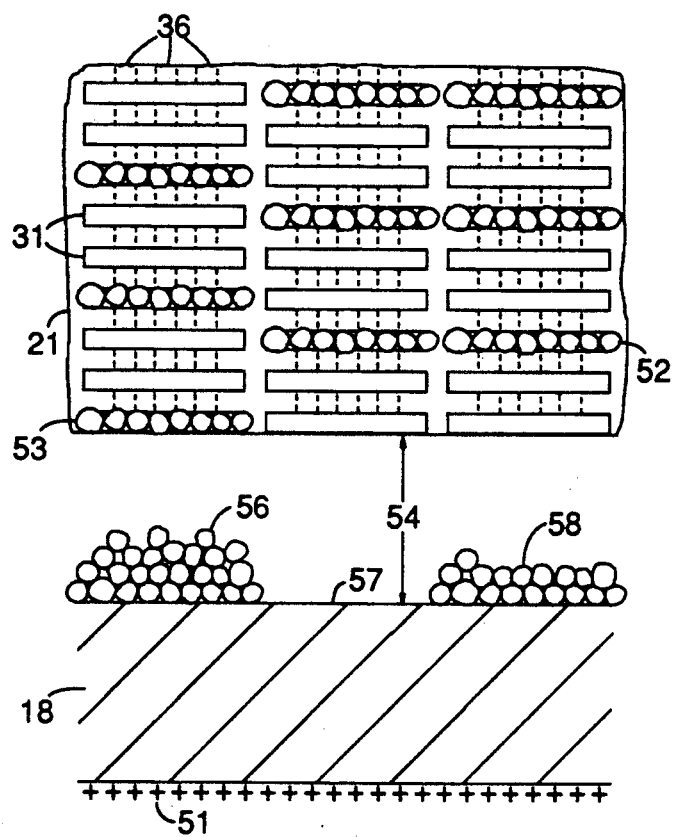
FIG. 5 is an enlarged view showing the relative geometry of the transfer end of the imaging conveyor and the receiving sheet during toner transfer.

FIG. 5 shows an expanded elevational view of the portion 5—5 imaging conveyor 12 built on flex circuit 21, in relation to a sectional view of the print substrate 18, shown in the preferred embodiment as a sheet of plain paper. A uniform positive charge 51 has been provided on the back surface of print substrate 18 via a corona discharge device, using methods known in the art. The transfer process will now be described. Electrodes 31 are in linear arrays and some arrays have a filled pattern of toner packets on every third electrode, ending with packets 52 in the hold position. The shifting of toner packets from electrode to electrode is controlled by voltage pulses supplied to the electrodes from integrated circuits (not shown) connected to feed lines 36 which are connected by feed-throughs to the electrodes in the manner of FIG. 3. If a pixel site is programmed for more toner, a packet such as 52 will continue stepping in response to the digital clock, one electrode at a time, into the transfer position 53. For a given pixel site, no packet holds will occur until after the last packet transfer. Packet 53 must jump across an air gap 54 to reach the front surface of print substrate 18. By switching the electrode under packet 53 to the negative polarity, packet 53 is released by the electrode and attracted by charge 51 into pixel position on the print substrate, forming a pile of toner 56 along with packets previously transferred. Depending on the number of pulses applied to the electrodes, a large pile 56, no pile 57, or a small pile 58 of toner particles is transferred onto pixel sites on the paper.

Figure 6:
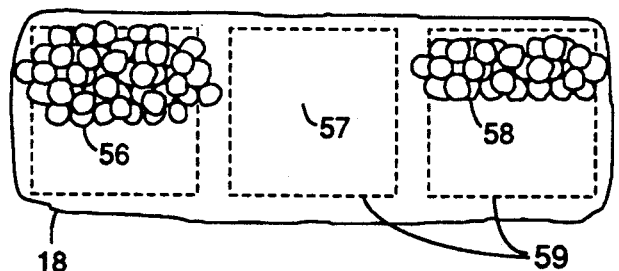
FIG. 6 is an enlarged plan view of large and small piles of transferred toner on pixel sites, prior to fixing.

FIG. 6 shows the same three piles of toner 56, 57 and 58 in plan view on the upper surface of print substrate 18, in relation to pixel sites 59.

Figure 7:
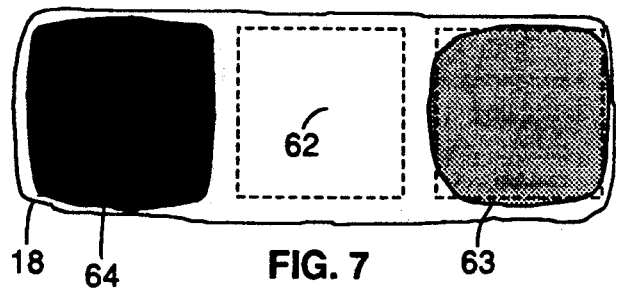
FIG. 7 is an enlarged plan view of the pixel sites of FIG. 6 after fixing, showing three levels of pixel depth (grey scale).

FIG. 7 shows the same plan view as FIG. 6, except after the fixing process has flattened the toner piles into planar pixel deposits of a thickness commensurate with the size of the toner pile prior to fusing. The fuser accomplishes the flattening of the toner piles and bonding to the paper by methods known in the art. In this illustration three levels of toner depth are shown, ranging from white 62, to light grey 63, and dark grey 64.

Figure 8:
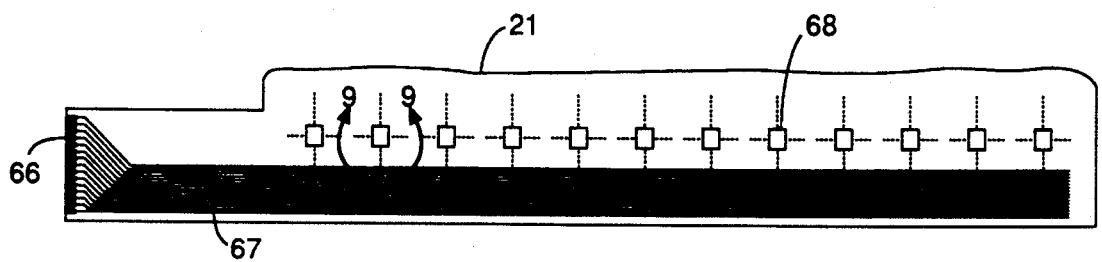
FIG. 8 is a fragmentary plan view of the portion 8—8 of FIG. 1 showing image data inputs to the imaging conveyor, and integrated circuits for processing the image data into programmed pulses.

FIG. 8 shows the portion 8—8 of FIG. 1, which is a fragmentary view of flex circuit 21 at the loading end. Flex circuit 21 includes two conductive layers, edge connector pads 66, and conducting traces 67 for providing power, data, and control signals to multiple identical large scale integrated circuits (ICs) 68 which are mounted on the flex circuit. Preferably the ICs are mounted using tape automated bonding (TAB) substrates to minimize the cost of input/output connections to the ICs.

Figure 9:
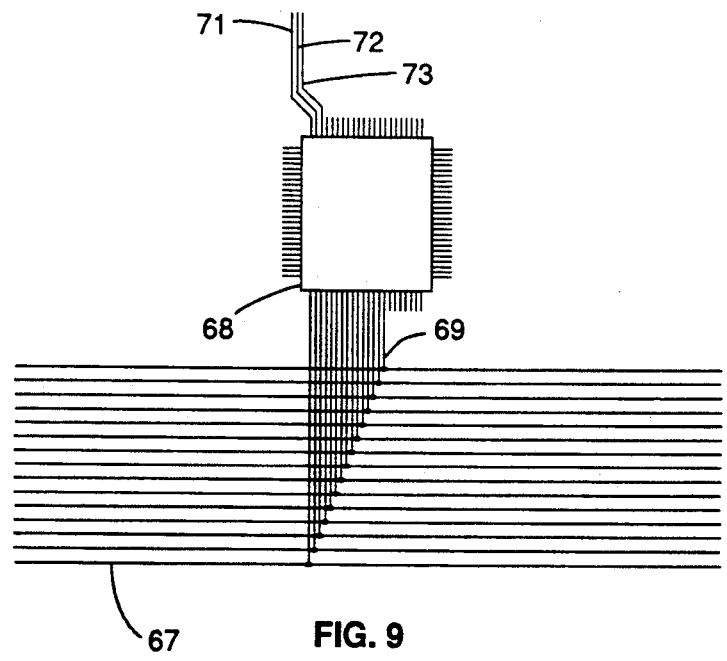
FIG. 9 is a detailed plan view of the portion 9—9 of FIG. 8 showing details of input and output connections to a digital integrated circuit of FIG. 8.

FIG. 9 shows the portion 9—9 of FIG. 8 which is an expanded plan view of IC 68 plus surrounding connecting traces. Conductive traces 67 of FIG. 8 connect to input traces 69 of IC 68. IC 68 contains the memory, logic, and driver circuits necessary for converting high level image descriptions into digital pulse trains for operating the imaging conveyor. The feed lines of each linear array of the imaging conveyor connect to conductors such as 71, 72, and 73 in order to provide a different set of Φ1, Φ2, and Φ3 to each linear array for independent control over each toner stream.

Figure 10A:
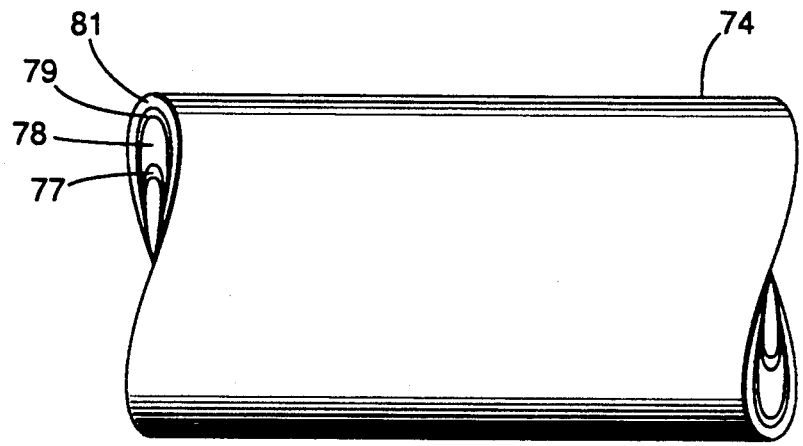
FIG. 10A is a side-elevational view of a digitally pumped tube conveyor of the present invention, including multiple layers.

FIG. 10A shows a side-elevational view of a multi-layered toner transport tube 74 which is a further embodiment of the present invention. Tube 74 is not used for imaging, but rather for transporting toner in a convenient fashion between two points. Tube 74 employs digital pumping means in order to achieve the flexibility of pumping in a forward direction at a controllable rate, pumping in a reverse direction, or holding toner in constant position within a toner conveyor.

Figure 10B:
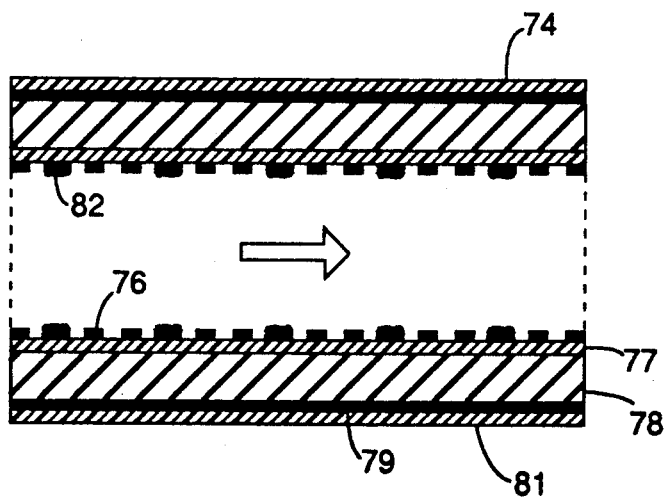
FIG. 10B is a cross-sectional schematic view of the digitally pumped tube conveyor of FIG. 10A.

FIG. 10B shows a cross-sectional view through the center of tubular conveyor 74. Spaced apart electrodes 76 are provided on a substrate of insulating material 77. Substrate 77 is contained within a tube of resilient insulating material 78. A conductive foil 79 is wrapped around tube 78 to provide an electromagnetic screen and is grounded at one end (not shown). Since digital pulses are applied to electrodes 76 during operation, it is necessary to screen electromagnetic radiations caused by the wide range of frequencies associated with the square shaped pulses, so that the radiations do not interfere with electrical equipment in close proximity to the tubular conveyor 74. A protective insulating layer 81 encloses conductive foil 79. It is convenient in practice to manufacture electrodes 76 and substrate 77 as a flex circuit. The flex circuit is manufactured as a flat sheet using standard processes to produce the conductive patterns forming electrodes 76, plus feed lines and feedthroughs (not shown). The flex circuit is cut, layered on a suitably dimensioned flat sheet of resilient material, then the combination formed into a tubular structure as shown. The resilient material may be sealed at the cut edges using, for example, thermal sealing means. Electrodes 76 form a linear array similar to 32 in FIG. 2 except that electrodes 76 are larger and wider spaced, and are annular when formed into the tubular embodiment. Because the electrodes are larger and wider spaced, and also because a higher rate of pumping is desired for toner delivery than for imaging of individual pixels, the multiphase clock for toner delivery pumping has generally a higher amplitude and different cycle time than the multiphase clock used in the imaging conveyor 12. Accordingly, the multiphase digital clock used for toner delivery pumping is designated $\zeta 1$, $\zeta 2$, and $\zeta 3$ to distinguish it from Φ1, Φ2, and Φ3 used for pixel imaging. In operation, the digital pumping action causes packets of toner 82 to jump from electrode to electrode in response to positive pulses applied to electrodes 76. The composite tube 74 is flexible so that it can be routed in space as required in practical printing arrangements.

Figure 11:
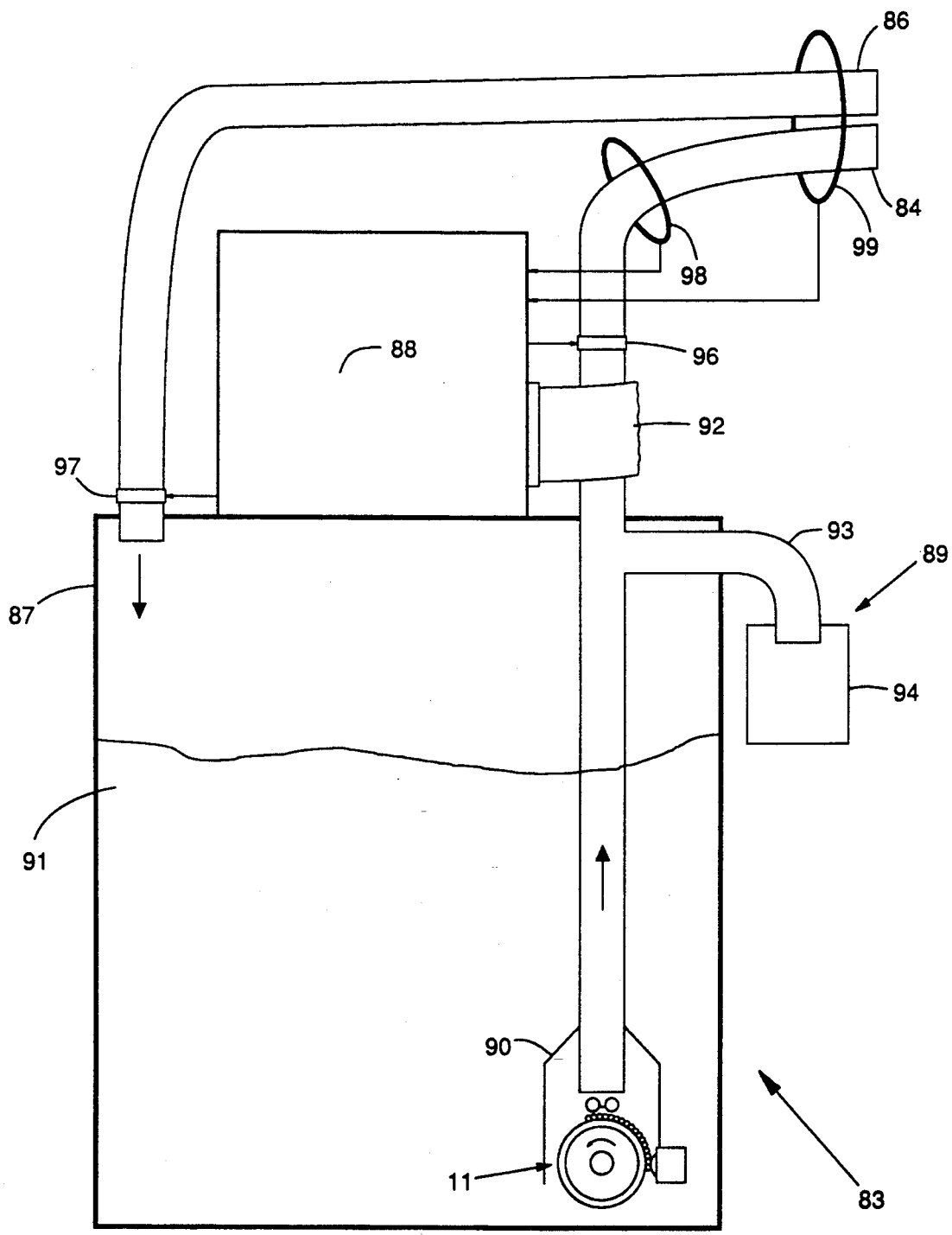
FIG. 11 is a schematic side-elevational illustration of a digitally pumped toner source module.

FIG. 11 is a diagrammatic side-elevational view of a self regulating toner source module 83. It includes a digitally pumped tube 84 that delivers toner to a print engine (not shown), and digitally pumped tube 86 that returns unused toner to toner reservoir 87. It also includes a controller module 88, and a trapping module 89. The same prior art toner source 11 as was previously described in reference to FIG. 1 is used to produce a cloud of negatively charged toner particles at the inlet end of tube 84. Shroud 90 allows toner particles to feed toner source 11 from the bottom side, but prevents bulk toner from otherwise interacting with toner source 11. Reservoir 87 contains monocomponent insulating toner 91 of a single color Cable means 92 connects toner source module controller 88 to the main print engine controller (not shown) for communication of high level commands to the toner source module and return of status information to the main controller. Optionally, cable 92 also delivers power to controller module 88. Trapping module 89 includes a short digitally pumped tube 93 which passes into a container 94 for collecting contaminant material and will be described further in FIGS. 12A and 12B. Tube 84 has a connector assembly 96 that connects pulse drivers (not shown) within controller module 88, to multiphase clock $\zeta 1$, $\zeta 2$, and $\zeta 3$ of tube 84, and depending on the toner path within the print engine, tube 86 may have a similar connector assembly 97.

During operation, charged toner particles are attracted to pulsed electrodes contained at the inlet end of tube 84, and are subsequently transported in toner packets through tube 84 to the print engine. In the preferred embodiment the predominant charge on toner cloud particles is negative, and the electrodes in tube 84 are positively pulsed to attract the negatively charged toner particles. In practical systems some positively charged particle can be expected near the inlet end of tube 84, but only negatively charged toner will be attracted into tube 84 and transported to the print engine. Thus, toner delivered to the print engine will be well charged; it will not contain wrong-sign toner particles, and particles of the correct sign will be charged beyond a threshold value because less strongly charged particles will not be captured by the pumping action of tube 84. A current meter 98 surrounds tube 84 and another current meter 99 surrounds both tubes 84 and 86. The stepping motion of packets of charged toner creates time varying current vectors along the tube axis, and these currents can be sensed by current meters 98 and 99 using known methods. Each current meter connects to a circuit within controller module 88 that integrates and averages the current pulses over time. In the case of current meter 99, toner packets are moving in opposite directions in tubes 84 and 86, so the total effective current will be the vector sum of the currents in tubes 84 and 86. Current meter 99, by integrating the vector sum current, measures the difference between the toner flow into the print engine, and the return flow of unused toner. Thus, current meter 98 provides a means to measure average toner flow into the print engine, and current meter 99 provides a means of measuring net flow corresponding to average toner usage. In both cases, circuits and algorithms to interpret the currents measured and compute the toner flows are implemented in controller module 88. Controller module 88 also includes control means to maintain a constant flow of toner into the print engine. In operation, the toner source module is subjected to environmental changes including changes in temperature, humidity, and power supply voltages. By computing the toner flows in real time, controller 88 can adjust the amplitude and cycle times of clock $\zeta 1$, $\zeta 2$, and $\zeta 3$ to maintain a constant or otherwise controlled rate of flow into the print engine. In addition, current meter 99 provides the sensing means for controller 88 to compute how much toner remains in the reservoir, and when toner is low can feed status information to the main contoller for appropriate action, or take action itself such as activating a warning lamp or tone. Finally, the digital control system, including controller 88 plus the main controller, can continuously monitor the desired rate of toner delivery versus the measured rate. The main controller can compute at any instant the desired or programmed delivery rate by computing a running average of the instantaneous toner transfers to the receiving sheet. It can compare this desired rate with the measured rate reported by the toner source module controller 88, and make adjustments to minimize the toner delivery error.

Figure 12A:
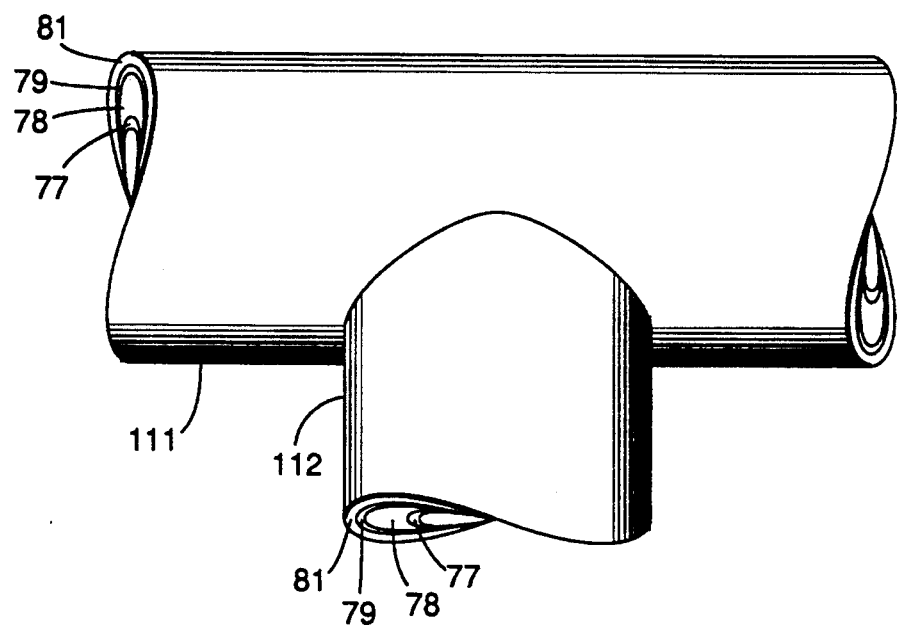
FIG. 12A is a side-elevational illustration of a digitally pumped trapping assembly of the present invention, used for trapping contaminant particles.
Figure 12B:
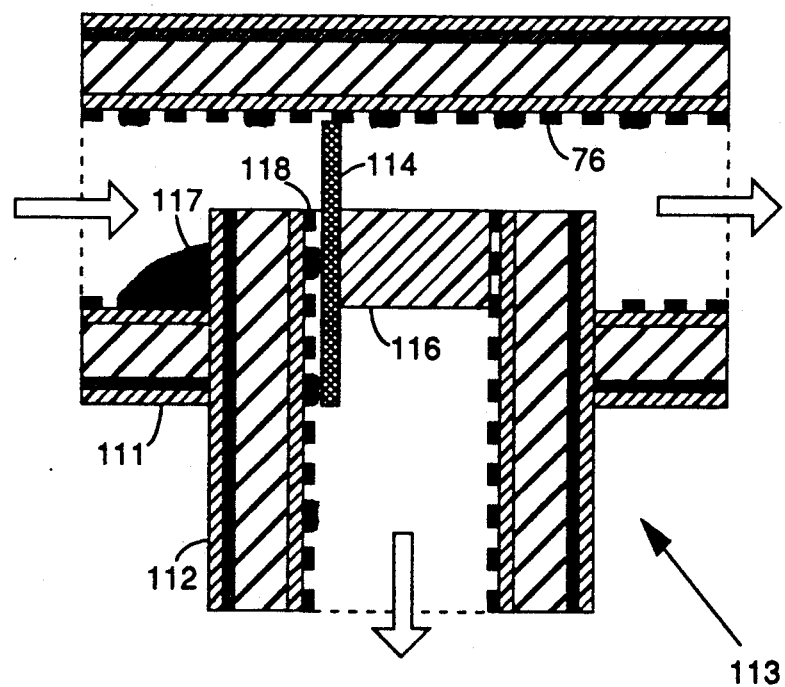
FIG. 12B is a cross-sectional schematic illustration of the trapping assembly of FIG. 12A.

The trapping module 89 of FIG. 11 is further described in FIGS. 12A and 12B. FIG. 12A is a side-elevational view of two digitally pumped tubular conveyors connected in a tee configuration. The main toner stream is conveyed in tube 111 and the trapping stream is conveyed in tube 112. FIG. 12B is a schematic cross-sectional view of a trapping assembly 113 showing the intersection of main stream tube 111 and trapping stream tube 112, wherein both tubes include digital pumping means including electrodes 76 as described in FIG. 10B. A hole is cut in main stream tube 111 using a cutting tool with diameter equal to the diameter of tube 112, avoiding the three feed lines supplying $\zeta 1$, $\zeta 2$, and $\zeta 3$ (not shown). A particulate filter 114 and blocking support 116 are bonded at the end of tube 112 before insertion into tube 111. Particulate filter 114 forms intimate contact with the inner surface of tube 111, and blocking support 116 is shaped to block toner particles that have passed through particulate filter 114 from subsequently entering tube 112. Toner pumping occurs at the inner surface of tube 111, with toner packets jumping between electrodes 76. A pile of negatively charged toner 117 accumulates where the path is blocked by tube 112. Properly charged toner particles of the desired diameter for printing jump through particulate filter 114 and continue onward within main tube 111. Contaminant particles are blocked by particulate filter 114 and accumulate near the surface of the filter, until they move within influence of electrodes 118 of trapping tube 112, whereupon they are captured by the digital pumping action of tube 112. The output of trapping stream tube 112 passes into the trapping reservoir 94 of FIG. 11 (not shown) which includes a transfer means (not shown) to pull packets of contaminant material off the end of tube 112.

Figure 13:
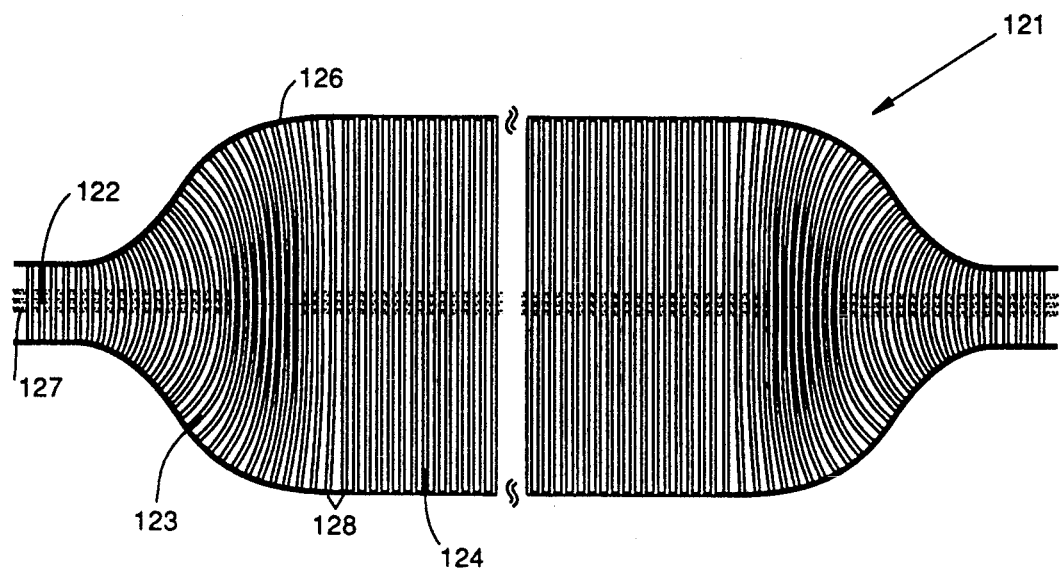
FIG. 13 is a plan view illustration of a flex circuit which is used in a digital pumping apparatus for transitioning between input and output ports which are in the form of tube conveyors, and a middle section in the form of a sheet conveyor.

FIG. 13 is a plan view schematic illustration of a digitally pumped toner delivery circuit component 121 of the present invention which is used to adapt between tubular entry and exit ports and a middle portion which monopumps packets of toner over a sheet surface. It is generally more convenient to use a tubular conveyor than a sheet conveyor between a toner source module and a print engine because of the compact geometry of the tubular conveyor and the closed shape which prevents contamination by ambient dust and other airborne contaminants. However, the preferred embodiment requires toner to be generated in a cloud for presentation of the imaging conveyor, and the cloud needs to be produced on a supporting member which extends the full length of the print head. Thus it is desirable to have a conduit for toner in the form of a tubular conveyor which can transition to a wide sheet conveyor for the purpose of generating the toner source cloud. Circuit component 121 is manufactured in sheet form using standard photolithographic processes to form shaped electrodes exemplified by 122, 123, and 124 on a flexible substrate 126. Three feed lines 127 carry multiphase digital clock $\zeta 1$, $\zeta 2$, and $\zeta 3$ on the back side of flex substrate 126 and connect in phase order via feedthrough contacts (not shown) to electrodes on the top surface. At each end, electrodes 122 are short and straight. These portions will later be formed into short tubes and interfaced to other digitally pumped tubes. The flex sheet periphery fans out along a curve to a wider dimension corresponding to the desired print width, plus a margin. Curved electrodes 123 are provided to step the toner packets from short electrodes 122 to longer electrodes 124 in the middle portion of circuit component 121. The shape and location of all the electrodes is determined by calculating equipotential lines for the charged toner particles, and applying a constraint on the maximum gap 128. In some regions the electrodes are bunched closely together. However, the toner packets jump in discrete steps in response to pulses applied via feed lines 127 to the electrodes. If the toner packets are capable of complete transfer at the widest gap distance, they also make a complete transfer at shorter gaps, and the desired result is uniform toner concentration along each electrode, and uniform toner flux from electrode to electrode.

Figure 14:
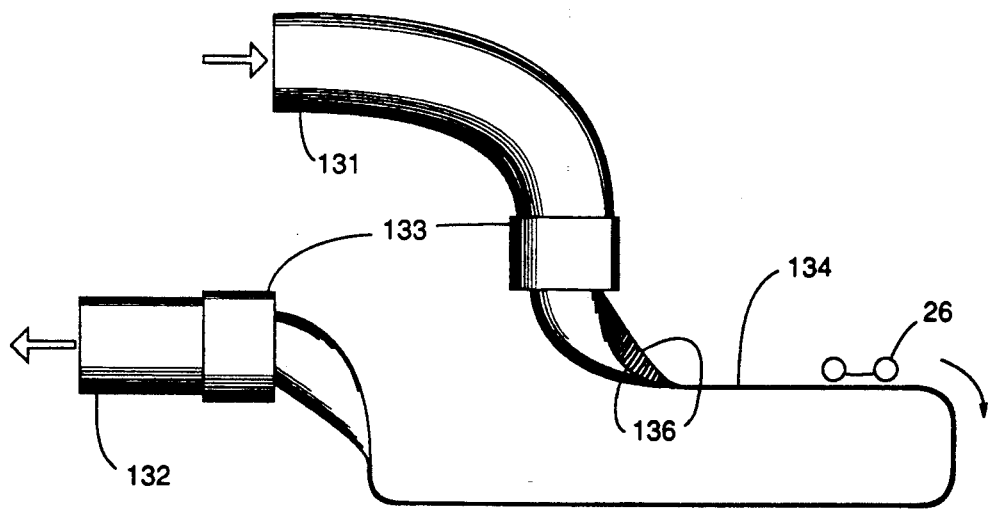

FIG. 14 shows how a toner source in sheet form 129 is provided using circuit component 121 of FIG. 13. Digitally pumped toner feed tube 131 and exit tube 132 are connected via interface assemblies 133 to a flex circuit component 121 as described in FIG. 13. Flex circuit component 121 is formed into tubes at each end, and into a sheet in the middle region 134 via self formed curves 136. Toner packets are pumped via tube 131 over the surface of sheet 134, and pass by electrode structure 26 which excites a charged toner cloud for presentation to the electrodes of an imaging conveyor (not shown) such as module 12 of FIG. 1. After the toner packets have passed by electrode structure 26 and supplied toner as required to the imaging conveyor, they stream back into digitally pumped toner exit tube 132 for return to the toner source module. Within interface assemblies 133, outer layers of tubes 131 and 132 are peeled back as required to expose the three conductive traces supplying $\zeta 1$, $\zeta 2$, and $\zeta 3$. These are then connected to traces 127 corresponding to $\zeta 1$, $\zeta 2$, and $\zeta 3$ of circuit component 121, and the outer layers are put back in place with provisions as necessary to prevent shorting between the grounded shield and the $\zeta 1$, $\zeta 2$, and $\zeta 3$ conductors. Finally a protective band is applied around the assembled interface to secure all the layers in place.

Figure 15:
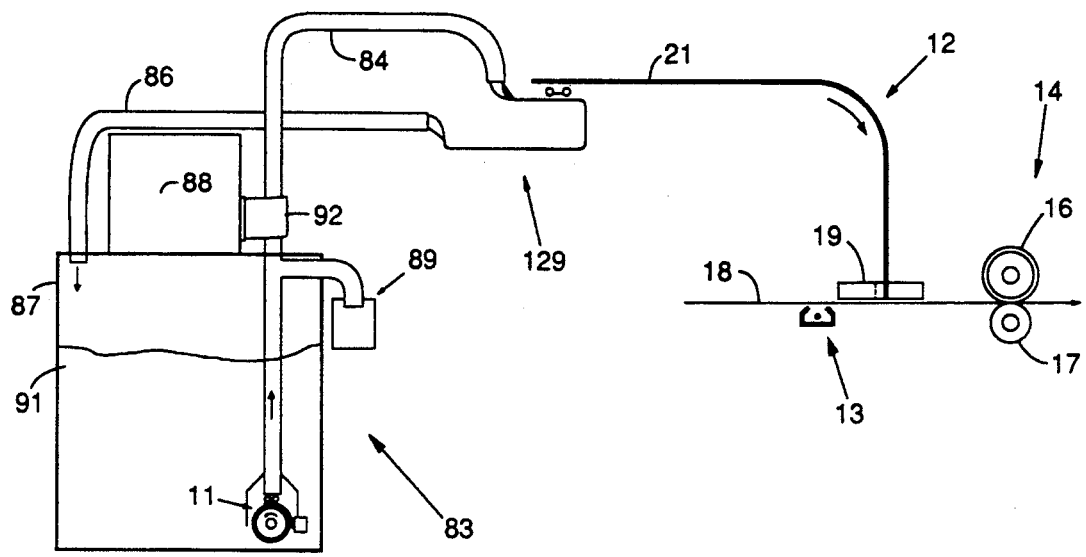
FIG. 15 is a schematic side-elevational view of a printing apparatus representing an embodiment of the present invention including a digitally pumped toner source module.

FIG. 15 is a diagrammatic illustration of a monochrome printing device employing toner source module 83 of FIG. 11, a sheet form toner source 129 of FIG. 14, and imaging conveyor 12 of FIG. 1 in combination with other elements previously described. In a printing device employing the digitally pumped conveyor method it is apparent that the only moving parts relate to a pair of friction imparting rollers in the toner source module, and various paper feed and fusing rollers, together with the motors and gears that drive them. This mechanical simplicity is made possible by the digital processes used to create, transport, and image packets of toner. The cost benefits arise primarily from elimination of mechanical parts and optical components, low cost control implementations using digital integrated circuits, and reduced lifetime costs associated with the high inherent reliability of digital integrated circuits.

Figure 16:
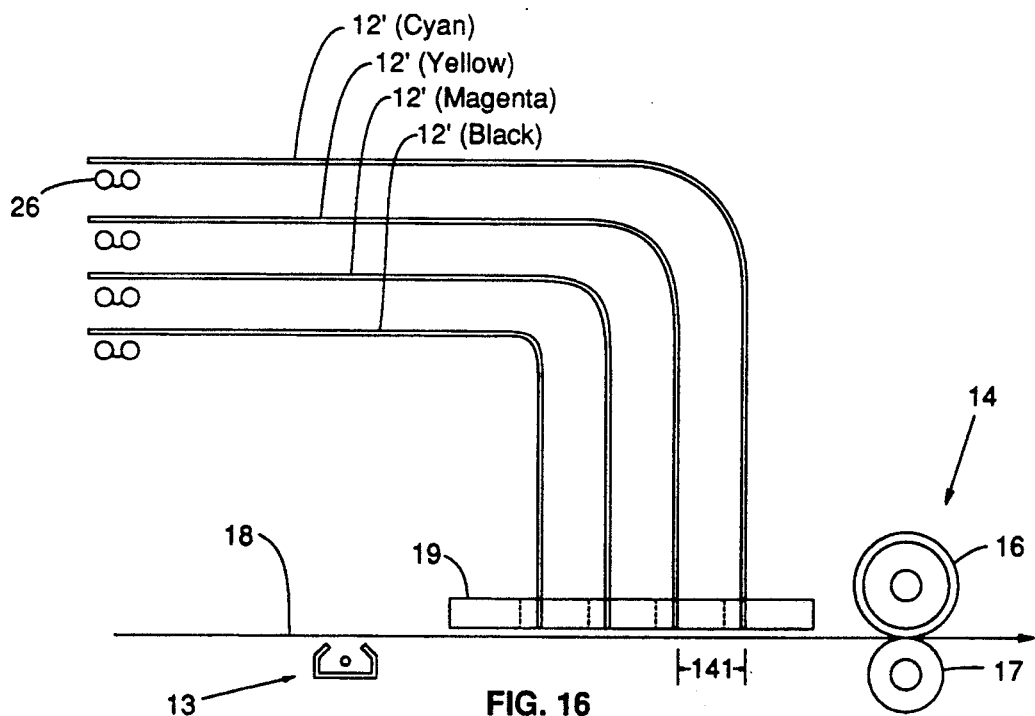
FIG. 16 is a schematic side-elevational illustration showing the combination of four digitally pumped sheet conveyors in a color printer of the present invention.

FIG. 16 is a schematic illustration of multiple imaging conveyors 12′, one for each primary color, arrayed to form a color printing device. The color printing method relies on translucent toner particles such that when particles of different color are superimposed on a print substrate, the resulting perceived color is the summation of the effects of each component color, independent of the stacking order of the color components, as is known in the art. The imaging conveyors 12′ can be fed by any toner sources that provide charged toner clouds in close proximity to the electrodes of the imaging conveyors. In operation, the four monochrome imaging conveyors operate in parallel. For each position of print substrate 18, each imaging conveyor 12′ delivers the correct number of toner packets to each pixel position, and thus forms a pixel line in one color. The separation distance, 141, between flex circuit terminations at printhead 19 is a multiple of the pixel repeat distance. Data is fed to each imaging conveyor such that each pixel position on print substrate 18 receives superimposed deposits of each of the primary colors, in accordance with their programmed pixel depth. In FIG. 16 the first packets transferred to the print substrate are black and form a black pixel line. After an appropriate number of steps of the print substrate, a magenta pixel line is transferred in superposition over the black pixel line, each of said lines corresponding to the same pixel line of the final color image. Similarly, yellow and cyan pixel lines are transferred in superposition over the pixel line already formed with black and magenta. The print engine controller (not shown) controls the stepper motor (not shown) that drives paper feeding rollers such as 17 in synchronism with bursts of print cycles for each color, such that pixel lines of each color are appropriately superimposed. Subsequently, the color image is fused permanently to print substrate 18 using fusing roller 16 and backup roller 17, as is known in the art. After fusing of the complete image, the page is ejected from the printhead using drive rollers such as 17, as is known in the art.

Figure 17:
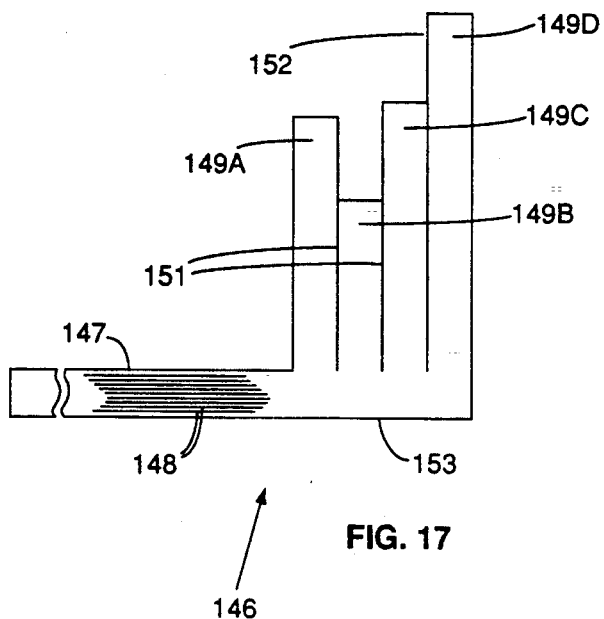
FIG. 17 is a schematic plan view of a flex circuit used in a moving head color printer embodiment of the present invention.

FIG. 17 is a plan view of a flex circuit 146 for use in a moving head color printer of the present invention. Flex circuit 146 includes a branch 147 that supplies print data via feed lines 148 to multiple fingers 149A, 149B, 149C, and 149D of the flex circuit. The fingers have slits 151 between them at a loading end 152 of the flex circuit. The other end 153 is the transfer end and has transfer electrodes as previously described (not shown) for transferring toner particles to the image receiving member displaced adjacent the end (not shown). Between the loading end and the transfer end are multiple linear arrays of electrodes (not shown) for pumping packets of toner from the loading end to the transfer end, under control of voltages supplied by feed lines 148. In a monochromatic moving head printer of the present invention, only one finger 149A is required. In FIG. 17 there are four fingers corresponding to four color printing.

Figure 18:
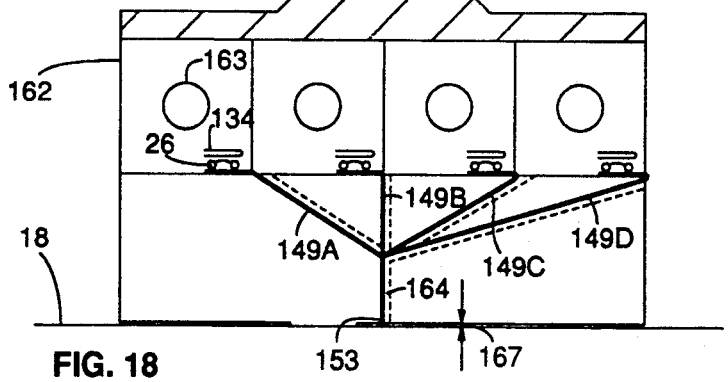
FIG. 18 is a side-elevational schematic view of a traversable printhead of the present invention.

FIG. 18 is a side-elevational schematic view of a traversable printhead 156 employing the flex circuit 146 of FIG. 17. A linear guide rail 157 supports slider 158 on balls 159 such that the slider 158 can traverse across the receiving sheet 18. A lead screw rotated by a motor (not shown) moves the slider 158 along the guide rail 157 under control of a print controller (not shown). Mounted under slider 158 are four compartments 162, each distributing toner of a different color. Each compartment 162 includes toner port 163 for connection to a toner transport tube 131 and a sheet conveyor 134 as described in FIG. 14. Sheet conveyor 134 is disposed adjacent an electrode structure 26 and a loading end of a finger such as 149A. Channels 164 provide space for toner packets to step along linear conveyors provided on flex circuit 146 to the transfer position 153. A gap 167 is maintained between receiving sheet 18 and the moving head at the point of transfer, to prevent smearing of deposited toner.

Figure 19:
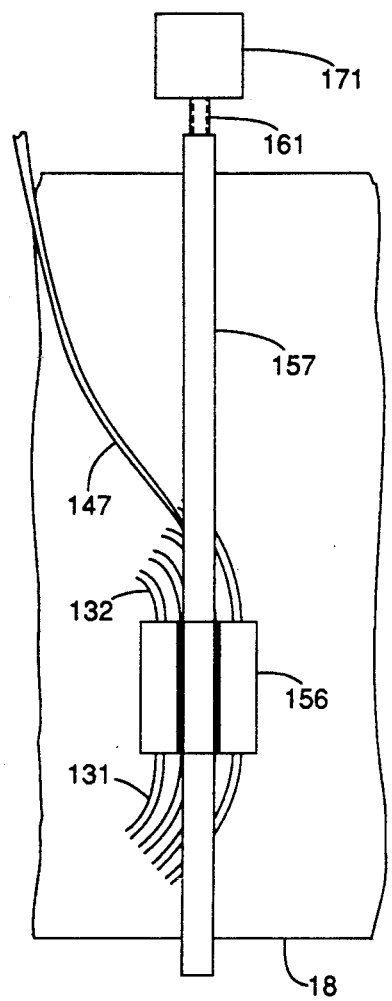
FIG. 19 is a plan view of a moving head color printer in accordance with another embodiment of the present invention.

FIG. 19 is a plan view of a moving head color printer of the present invention. Guide rail 157 spans receiving sheet 18 and printhead 156 is capable of traversing the width of receiving sheet 18 in controlled increments or steps when lead screw 161 is rotated by motor 171 under control of the print engine controller (not shown). Flex circuit branch 147 connects to a data source (not shown) and feeds toner packet stepping data to printhead 156. Toner feed tubes 131 and exit tubes 132 are as described in FIG. 14, and transport toner of different colors through the print head as it traverses the receiving sheet 18. In operation, the printhead steps along guide rail 157 printing all pixel sites for which toner is required and to the pixel depth required for each color, between each step along rail 157. The following example illustrates a preferred embodiment in which each finger of the flex circuit 146 has eight linear arrays of electrodes corresponding to eight independently controllable toner streams. The printhead 156 starts at the top edge of receiving sheet 18 and prints the first eight pixel sites to the required pixel depths using black toner. Then printhead 156 moves eight pixel positions across the page, and two sets of eight pixel sites each are printed in parallel using black and magenta, repectively. After moving eight more pixel positions across the page, three sets of eight pixel sites are printed in parallel using black, magenta, and yellow. After moving eight more pixel positions across the page, four sets of pixel sites are printed in parallel using black, magenta, yellow, and cyan. This process of moving across the page by eight pixel positions, then printing in parallel all pixels sites requiring toner, and to the toner depth required, is repeated until printhead 156 has stepped across the full width of the paper and a full pixel line has been printed; then the receiving sheet is advanced by one pixel position. The printhead controller keeps track of color superposition at pixel sites, such that toner is transferred to the receiving sheet in image configuration.

It should be apparent by the teaching of the invention, that digital toner pumping methods have broad applicability to printing machines. Embodiments for simple toner conveyance engines, contaminant trapping engines, toner source modules, and high speed imaging engines have been described; other embodiments will be apparent to practitioners skilled in the art.

What is claimed is:

1. A printing apparatus for printing on an image receiving member comprising:
   a source of toner particles;
   at least one particle conveyor means that conveys toner particles from a loading point adjacent said toner source to a transfer point adjacent said image receiving member in response to conveyor voltages;

means for presenting the image receiving member to the particle conveyor at said transfer point;

means for transferring particles from said transfer points of said conveyor means to corresponding pixel sites on said image receiving member; and means for applying control voltages to said conveyor means to deliver a predetermined amount of toner to each of said corresponding pixel sites on said image receiving member.

2. A printing apparatus as in claim 1 in which said particle conveyor comprises a substrate with an array of spaced electrodes, with the end electrode comprising a toner particle transfer electrode, in which said means for applying control voltages to said conveyor means comprises drive lines connected in repeating sequence to the spaced electrodes, and said voltages are applied in phase order to said drive lines to cause packets of toner particles to selectively move from the source of toner particles to the transfer electrode, according to the demand for toner at the current pixel site on said image receiving member.

3. A printing apparatus as in claim 2 wherein the image receiving member and the particle transfer electrode are moved relative to one another to accomplish printing of a two-dimensional image.

4. A printing apparatus as in claim 1, 2, or 3 wherein said image receiving member and said particle transfer electrode are moved relative to one another in periodic steps, whereby a controlled number of packets of toner can be delivered to each pixel site on the image receiving member between each of said steps.

5. A printing apparatus as in claim 2 wherein said means for delivering a predetermined amount of toner includes means for controlling the applied voltages wherein a counted number of toner packets are advanced to the end electrode and transferred to a pixel site on the image receiving member to control the toner depth at said pixel site.

6. A printing apparatus as in claim 5 wherein said means for applying and controlling voltages to said conveyor means comprises a programmable multiphase digital clock generator whose output is connected in phase order to said drive lines of said particle conveyors, said digital clock being programmed to create packets of toner at a loading end of said conveyor means, and to selectively convey the toner packets to said transfer electrodes depending on the demand for toner at corresponding pixel sites on said image receiving member.

7. A printing apparatus as in claim 6 wherein the multiphase digital clock is formed of square shaped pulses which are programmed in accordance with said counted number of toner packets in order to deliver the predetermined amount of toner to said corresponding pixel sites on said image receiving member.

8. A printing apparatus as in claim 1, 2, 3, 5, 6, or 7 including means to fix said toner particles after transfer to said receiving member to produce a permanent image on said receiving member.

9. A printing apparatus for forming toner images on an image receiving member, said apparatus including:
a source of charged toner particles;
at least one particle conveyor comprising a linear array of spaced electrodes provided on a substrate with control lines connected in repeating sequence to said electrodes;

means for creating packets of charged toner particles at a loading end of said particle conveyor adjacent said toner source;

a programmable multiphase digital clock generator whose output is connected in phase order to said control lines of said particle conveyor, serving to selectively move charged particles along said substrate in a digitally controlled manner to the other end;

means to transfer said toner particles from the other end of said particle conveyor to said receiving member; and means for moving said image receiving member relative to said other end of the particle conveyor.

10. A printing apparatus as in claim 9 wherein a plurality of said substrates are provided with each substrate providing toner particles of a different color for selective transfer to said image receiving member to create a composite image with a wide range of colors on said image receiving member.

11. An electrostatic printing apparatus for printing on an image receiving member comprising:

plurality of linear arrays of electrodes, each array terminating with a transfer electrode adjacent said image receiving member at one of a plurality of pixel positions across said image receiving member;

means to support said linear arrays and dispose said transfer electrodes adjacent said image receiving member;

means for supplying toner particles to a loading end of each of said linear arrarys;

means for supplying voltages to the electrodes of each of said linear arrays;

means for controlling said voltages whereby packets of toner are selectively conveyed from said loading end and from electrode to electrode to said transfer electrodes on each of said linear arrays, according to a predetermined number of packets required to print the desired pixel intensity on said image receiving member; and means to transfer toner from said transfer electrodes to corresponding pixel sites on said image receiving member.

12. An electrostatic printing apparatus as in claim 11 including means for moving said image receiving member relative to said transfer electrodes such that a two-dimensional image can be synthesized from multiple images sequentially printed on the image receiving member.

13. An electrostatic printing apparatus as in claim 12 and including means to traverse said transfer electrodes across the face of said image receiving member.

14. An electrostatic printing apparatus as in claim 12 and including means to move the image receiving member by one pixel position after each pixel line has been imaged on said image receiving member.

15. An electrostatic printing apparatus as in claim 14 wherein subsets of said linear arrays are used to deliver toner of different colors to each pixel position, such that a color image with a wide range of colors can be formed on said image receiving member by combining colors delivered by each of said subsets to each of said pixel positions.

16. A printing apparatus for capturing, conveying, and transferring toner for delivery in image configuration onto an image receiving member, said apparatus comprising:
- a toner source;
- a substrate sheet;
- a plurality of side-by-side linear conveyor means, each comprising an array of spaced electrodes extending from one end of the substrate to the other, with the end electrode comprising a toner particle transfer electrode;
- drive lines connected in repeating sequence to the spaced electrodes in each of said linear conveyors;
- means for generating and applying a digital clock in phase order to the drive lines in each conveyor to cause packets of toner to be captured at a loading end of said conveyor adjacent said toner source, and move to holding electrodes spaced apart from said transfer electrodes;
- means for selectively stepping packets of toner from said holding electrodes to said transfer electrodes according to the the toner depth required at corresponding pixel sites on the image receiving member;
- means to present the image receiving member to the substrate sheet in close relation to said transfer electrodes of said linear conveyor means; p1 means for transferring particles from said transfer electrodes to said image receiving member to deliver toner from the transfer electrodes to corresponding pixel sites on said image receiving member;
- means for moving said substrate sheet and said image receiving member relative to one another to form lines of pixels, each pixel receiving toner in accordance with the toner depth programmed for that pixel.

17. A printing apparatus as in claim 16 wherein said image receiving member is a sheet of plain paper.

18. A printing apparatus as in claim 16 and including a plurality of said substrate sheets, each substrate sheet being programmed to selectively deliver toner of a different color to said image receiving member, such that a composite color image with a wide range of colors is deposited in image configuration on said image receiving member.

19. A programmable toner particle conveyor apparatus comprising:
- a substrate with a linear array of spaced electrodes;
- drive lines connected in repeating sequence to said electrodes; and
- a multiphase digital clock whose output is connected in phase order to said drive lines of said linear array, each phase of said digital clock being programmable in amplitude and polarity as a function of time, such that movement of charged particles on said substrate is digitally controllable with respect to flow rate and direction of travel.

20. A programmable particle conveyor apparatus as in claim 19 wherein said substrate is in the form of a tube.

21. A programmable particle conveyor apparatus as in claim 19 wherein said substrate is in the form of a sheet.

22. A programmable particle conveyor apparatus as in claim 19 wherein said substrate transitions in form between a tube and a sheet.

23. A programmable particle conveyor apparatus as in claim 19 including a conductive layer to screen electromagnetic waves emanating from said conveyor such that said waves do not cause electrical interference in surrounding equipment.

24. A programmable particle conveyor apparatus as in claim 23 and including particle filtering means to filter contaminants from the remaining particles.

25. A programmable particle conveyor apparatus as in claim 24 and including a tee junction of conveyors, creating a separate conveyor branch for the contaminant particles.

26. A toner source apparatus comprising:
- a toner reservoir;
- monocomponent toner;
- means to charge and meter toner onto a suporting member;
- means to form a cloud of charged toner particles adjacent said supporting member; and
- particle conveyor means to deliver charged toner from a loading point adjacent said toner cloud to a user of said toner, said conveyor means including a linear array of electrodes, feed lines connected in repeating sequence to said electrodes, a programmable multiphase digital clock connected in phase order to said feed lines, such that charged toner particles are conveyed along said conveyor from electrode in a digitally controlled manner.

27. A toner source apparatus as in claim 26 and including a controller to adjust toner delivery rate direction in accordance with external commands.

28. A toner source apparatus as in claim 27 including feedback means to sense and measure flow rates of said toner within input and output ports of said reservoir, and control means to control toner flow at a predictable rate.

29. An electrostatic printing apparatus comprising:
- a toner reservoir;
- monocomponent toner;
- means to charge and meter toner onto a supporting member;
- means to form a cloud of charged toner particles adjacent said supporting member;
- toner conveyor means to deliver toner from a loading point adjacent said toner cloud to an imaging conveyor, said toner conveyor means comprising a linear array of electrodes, feed lines connected in repeating sequence to said electrodes, a programmable multiphase digital clock connected in phase order to said feed lines, such that packets of toner are conveyed along said toner conveyor from electrode to electrode in a digitally controlled manner;
- means to form a cloud of charged toner particles adjacent said toner conveyor means and adjacent a loading end of an imaging conveyor;
- said imaging conveyor comprising linear arrays of electrodes, feed lines connected in repeating sequence to electrodes of each of said linear arrays, a programmable multiphase digital clock connected in phase order to each of said feed lines, such that packets of toner are conveyed along said linear arrays from electrode to electrode in a digitally controlled manner to transfer points adjacent said image receiving member;
- means for presenting the image receiving member to said imaging conveyors at said transfer points;
- means for transferring toner packets from said transfer points to corresponding pixel sites on said image receiving member;
- means for applying and controlling voltages to said imaging conveyors to deliver a predetermined amount of toner to each of said corresponding pixel sites on said image receiving member; and means for moving said image receiving member relative to said transfer points.

30. The method of printing with a toner on a substrate comprising the steps of:

conveying toner by moving the toner along a conveyor from a toner source to a pixel transfer position;

positioning the substrate opposite said pixel transfer position;

transferring toner from said pixel transfer position to a pixel site on said substrate during a print cycle; and controlling the amount of toner conveyed to said pixel transfer position during a print cycle to control the toner depth at said pixel site.

31. The method as in claim 30 including the step of providing relative movement between the substrate and the pixel transfer position to print a two-dimensional image.

32. The method of claim 31 in which toner is independently delivered to a plurality of in-line pixel transfer positions and said substrate is moved perpendicular to said line whereby to simultaneously print a line of pixel sites on said substrate.

33. The method of printing as in claim 30 in which the toner is conveyed in packets of toner and a predetermined number of packets are delivered to each pixel site.

* * * * *

UNITED STATES PATENT AND TRADEMARK OFFICE
CERTIFICATE OF CORRECTION

PATENT NO. : 5,153,617

DATED : October 6, 1992

INVENTOR(S) : Peter C. Salmon

It is certified that error appears in the above-identified patent and that said Letters Patent is hereby corrected as shown below:

Column 19, line 25, delete "p1" and begin new subparagraph

Column 20, line 25, after "electrode" insert --to electrode--

Signed and Sealed this

Twenty-third Day of November, 1993

*Attest:*

BRUCE LEHMAN

*Attesting Officer*    *Commissioner of Patents and Trademarks*